(12) United States Patent
Zhang et al.

(10) Patent No.: US 7,403,642 B2
(45) Date of Patent: Jul. 22, 2008

(54) EFFICIENT PROPAGATION FOR FACE ANNOTATION

(75) Inventors: Lei Zhang, Beijing (CN); Mingjing Li, Beijing (CN); Wei-Ying Ma, Beijing (CN); Yan-Feng Sun, Beijing (CN); Yuxiao Hu, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 11/111,696

(22) Filed: Apr. 21, 2005

(65) Prior Publication Data

US 2006/0239515 A1    Oct. 26, 2006

(51) Int. Cl.
*G06K 9/00* (2006.01)
(52) U.S. Cl. ............... 382/118; 707/104.1; 382/305
(58) Field of Classification Search ............ 382/118
See application file for complete search history.

(56) References Cited

U.S. PATENT DOCUMENTS

| 6,940,545 | B1 | 9/2005 | Ray et al. | |
|---|---|---|---|---|
| 2004/0085578 | A1* | 5/2004 | Quek et al. | 358/1.18 |
| 2004/0213553 | A1* | 10/2004 | Nagahashi | 386/69 |
| 2004/0264780 | A1* | 12/2004 | Zhang et al. | 382/224 |

OTHER PUBLICATIONS

Cohen, et al., "Learning Bayesian Network Classifiers for Facial Expression Recognition Using both Labeled and Unlabeled Data", Proceedings of the IEEE Computer Society Conference on Computer Vision and Pattern Recognition (CVPR'03), Jun. 20, 2003, IEEE, 2003, pp. 1-7.
Moghaddam, et al., "Bayesian Face Recognition with Deformable Image Models", IEEE, 2001, pp. 26-34.

* cited by examiner

*Primary Examiner*—Samir Ahmed
*Assistant Examiner*—Aklilu k Woldemariam
(74) *Attorney, Agent, or Firm*—Lee & Hayes, PLLC (57) ABSTRACT

Systems, engines, user interfaces, and methods allow a user to select a group of images, such as digital photographs, and assign to the group of images the name of a person who is represented in each of the images. The name is automatically propagated to the face of the person, each time the person's face occurs in an image. In one implementation, names and associations are shared between a browsing mode for viewing multiple images at once and a viewer mode, for viewing one image at a time. The browsing mode can provide a menu of candidate names for annotating a face in a single image of the viewer mode. Likewise, the viewer mode can provide annotated face information to the browser mode for facilitating name propagation. Identification of a person's face in multiple images can be accomplished not only by finding similarities in facial features but also by finding similarities in contextual features near the face in different images.

17 Claims, 8 Drawing Sheets

EFFICIENT PROPAGATION FOR FACE ANNOTATION

TECHNICAL FIELD

The subject matter relates generally to digital image management and more specifically to efficient propagation for face annotation.

BACKGROUND

Face annotation is very important in the management of digital photo albums, because it provides information about who is in the photos and thus can help users organize and manage their digital albums. Although there are already many commercial products that try to assist with electronic photo album annotation, they all require human annotations, a tedious task very few users will perform.

Most conventional products offer a degree of image management for digital photo albums, but the image management is similar to the file management, which is based on the name, size, date/time and other properties of the image files. Face annotation is not provided. Only manual annotation of images is provided in conventional products.

In one conventional product, faces in photos are detected automatically by a face detector and if a user would like to annotate the faces, the conventional system calculates a candidate list of names from which the user annotates each face. The candidate list can be calculated according to a face's similarity with already annotated faces. The user might accept one of the recommendations, or instead enter a new name for the face. In a typical scenario, if a user desires to label a face, the user moves a mouse onto the face, and a candidate name list pops up to provide one or more recommendations.

SUMMARY

Systems and methods allow a user to select a group of images, such as digital photographs, and assign to the group the name of a person who is represented in each of the images. Then, the name is automatically propagated to the face of the person, each time the person's face occurs in an image. In one implementation, names and associations are shared between a browsing mode for simultaneously viewing multiple images and a viewer mode, for viewing images one at a time. The browsing mode can provide additional information to the viewer mode for generating a menu of candidate names for annotating a face in a single image. Likewise, the viewer mode can provide manually annotated face information to the browser mode for facilitating automatic name propagation. In one implementation, identification of a person's face in multiple images can be accomplished not only by finding similarities in facial features but also by finding similarities in contextual features near the face in different images.

The subject matter formulates exemplary name propagation as an optimization problem. An objective function is defined as the sum of similarities between each pair of faces of the same individual appearing in different photographs. Maximization of the objective function leads to the optimal solution for name propagation. To make the system more effective in annotation and propagation, name propagation accuracy can be improved if some faces have been previously annotated, and similarly, annotation accuracy can be improved if some photographs have already been associated with names.

DETAILED DESCRIPTION

Overview

Described herein are systems, engines, user interfaces, and methods for annotating digital images in a collection, such as a family photo album. The subject matter can automatically propagate labels, such as names, from the level of a batch of images to the level of a visual item within the images, even though the item may vary somewhat between images. In one implementation, the subject matter provides an automatic or semi-automatic approach to annotate faces in a typical digital family photo album, which usually contains a limited number of approximately 10-100 persons who appear frequently.

For example, the systems and methods for annotating digital images in a collection can allow a user to select a batch of digital photos, apply to the batch the name of a person who appears in each photo, and then propagate the name to a face that is common to each photo in the selection. Thus, the systems and methods infer correspondence between name and face. In one implementation, this saves a human user from having to manually name people shown in photographs. Rather than open each photograph, a user can look at a batch of thumbnails to see who is in each photograph, and use a mouse to select multiple photographs with a particular individual that the user wants to label. Since browsing thumbnails has now become common in most photo management systems, users can annotate on a photograph level, instead of on a "face-by-face" level, i.e., users can efficiently label a group of photographs in a batch manner.

Figure 1:
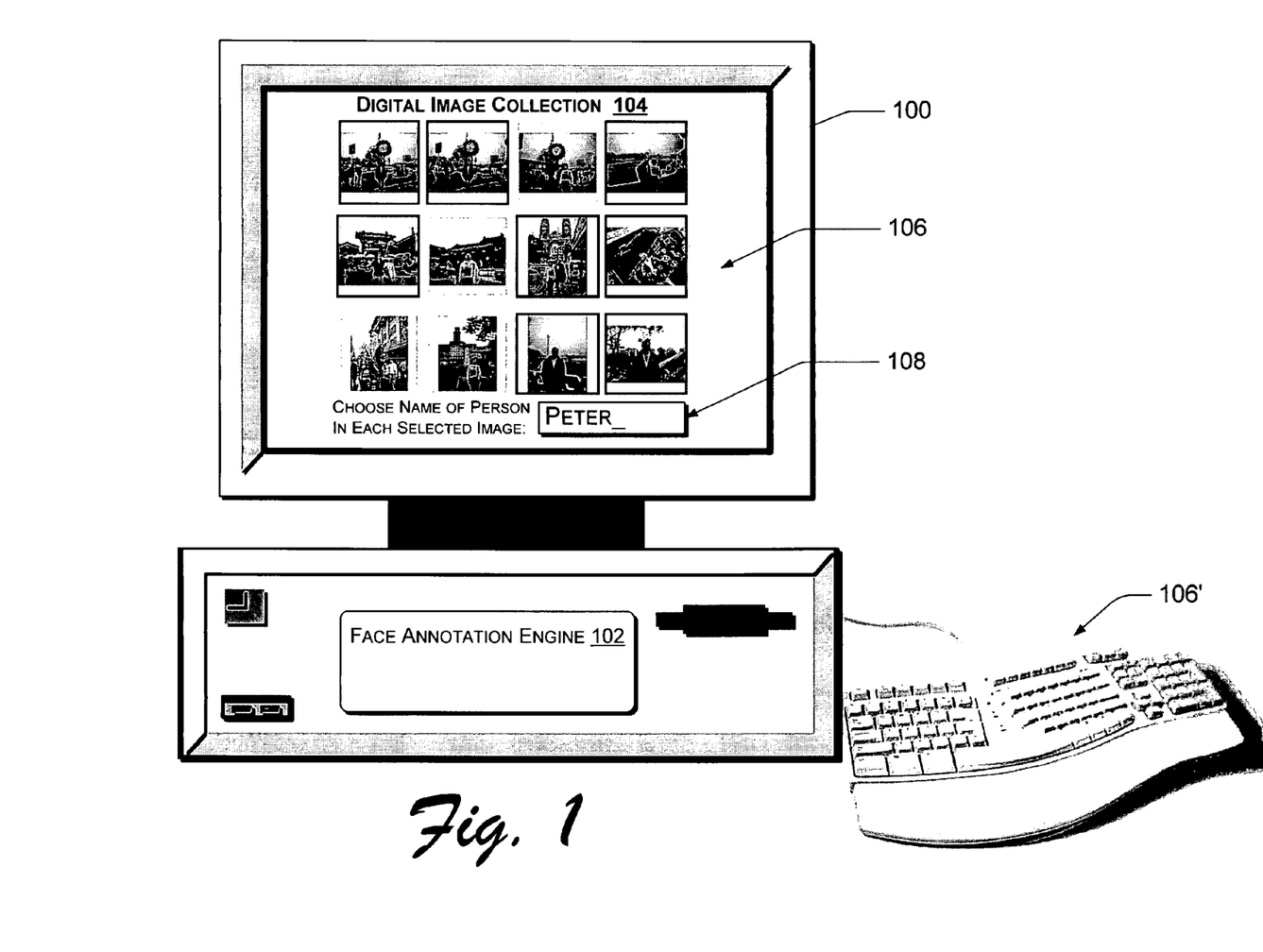
FIG. 1 is a diagram of an exemplary system for name propagation and face annotation.

FIG. 1 shows an example environment for implementing the systems and methods. In one implementation, a computing device 100 includes an exemplary face annotation engine 102. The face annotation engine 102 may assist in managing one or more digital image collections 104 via user interfaces 106 and 106', and can apply names to the faces that appear in the image collection 104. In one implementation of the subject matter, a user selects a set of images from the image collection 104 (i.e., "multi-selects" images). In FIG. 1, selected images are shown as having a darker image border on than non-selected images. The user then provides a name 108 for a person whose face is common to the selected images. The face annotation engine 102 matches the provided name 108 to the correct face in the selected images using a similarity measure function to compare facial and contextual features information, to be discussed more fully below. The face annotation engine 102 can then propagate the name to other images in which the face appears, for example, to other non-selected images in the image collection 104 or to new images added to the image collection 104.

In another aspect of the subject matter, the face annotation engine 102 manages face annotation across different modes of viewing the image collection 104, exploiting advantages of each viewing mode for benefiting face annotation in the other mode(s). For example, given a browsing mode that displays thumbnail images and a "viewer" mode that displays single images one at a time, as in a slideshow, these two modes can accomplish face annotation synergistically. In the viewer mode, for example, a drop-down menu can present the user with naming choices. Once a name is associated with a face in this manner, then this association can be used in the browsing mode to propagate the name to other images bearing the same face. Likewise, name propagation that occurs in the browsing mode can also facilitate generating the names to populate the drop-down menu in the viewer mode.

Exemplary Face Annotation Engine

Figure 2:
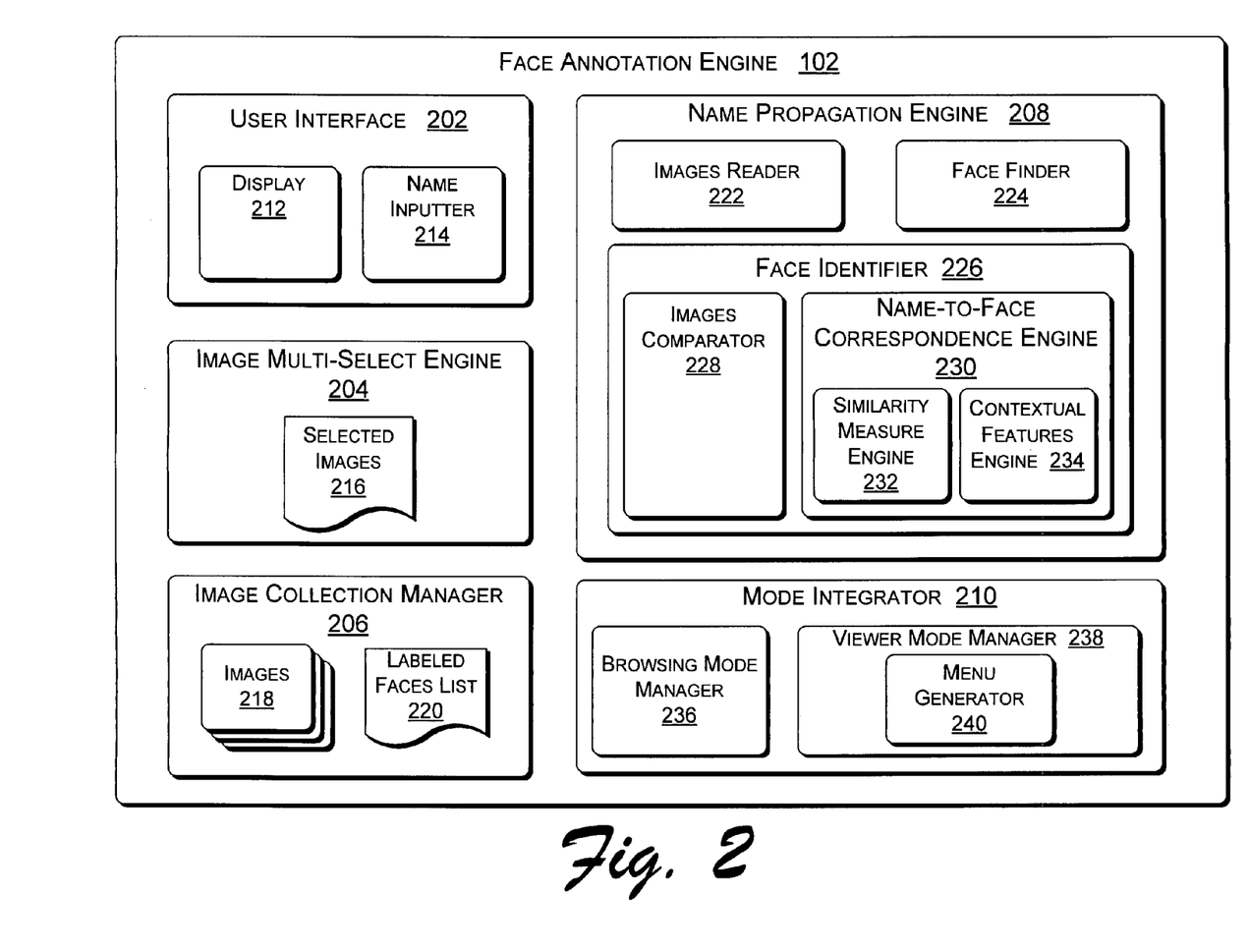
FIG. 2 is a block diagram of an exemplary face annotation engine.

FIG. 2 shows the exemplary face annotation engine 102 of FIG. 1 in greater detail. The face annotation engine 102 in FIG. 2 is meant to provide one example arrangement for the sake of overview. Many other arrangements of the illustrated components, or similar components, are possible. It is worth noting that the face annotation engine 102 of FIG. 2 can be executed in hardware, software, or combinations of hardware, software, firmware, etc.

A list of exemplary engine components is now provided. The exemplary face annotation engine 102 includes a user interface 202, an image multi-select engine 204, an image collection manager 206, a name propagation engine 208, and a mode integrator 210. The user interface 202 includes a display 212 and a name inputter 214. The image multi-select engine 204 may include a database or storage area of selected images 216. The image collection manager 206 stored the images 218 and a labeled faces list 220. The name propagation engine 208 includes an images reader 222, a face finder 224, and a face identifier 226. The face identifier 226 further includes an images comparator 228 and a (name-to-face) correspondence engine 230. The correspondence engine 230 includes a similarity measure engine 232 and a contextual features engine 234. The mode integrator 210 further includes a browsing mode manager 236, and a viewer mode manager 238 that may include a menu generator 240.

Integration of Annotation Modes

Figure 3:
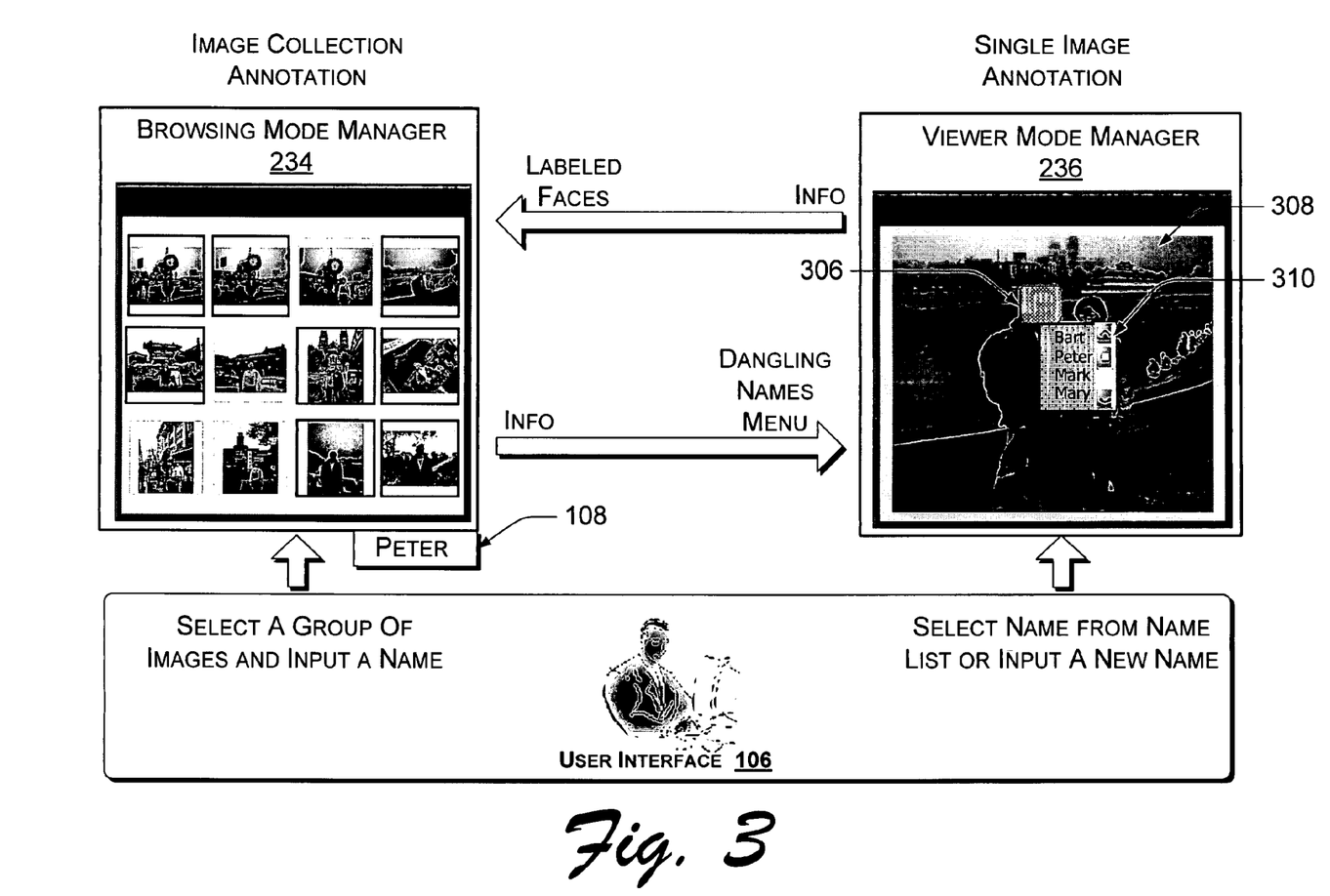
FIG. 3 is a diagram of exemplary mode integration for face annotation.

In one implementation, the face annotation engine 102 integrates name annotation activities and shared data between the browsing mode manager 236 and the viewer mode manager 238. That is, as shown in FIG. 3, the mode integrator 210 integrates face annotation that occurs in a browsing mode 302 (in which multiple of the images 218 are presented as thumbnails in the display 212) with face annotation that occurs in a viewer mode 304 (in which the images 218 are presented on the display 212 one at a time). The two modes do not necessarily occur at the same time.

In the viewer mode 304, the viewer mode manager 238 allows a user to move a mouse, for example, onto a face 306 in a displayed image 308, and the menu generator 240 creates a candidate name list 310 that can appear to provide a labeling recommendation. The user can either select a name from the name list 310, or enter a new name via the name inputter 214 for the selected face 306. The menu generator 240 generates the candidate name list 310 from historical labeling and/or name propagation results, i.e., the labeled faces list 220.

Figure 4:
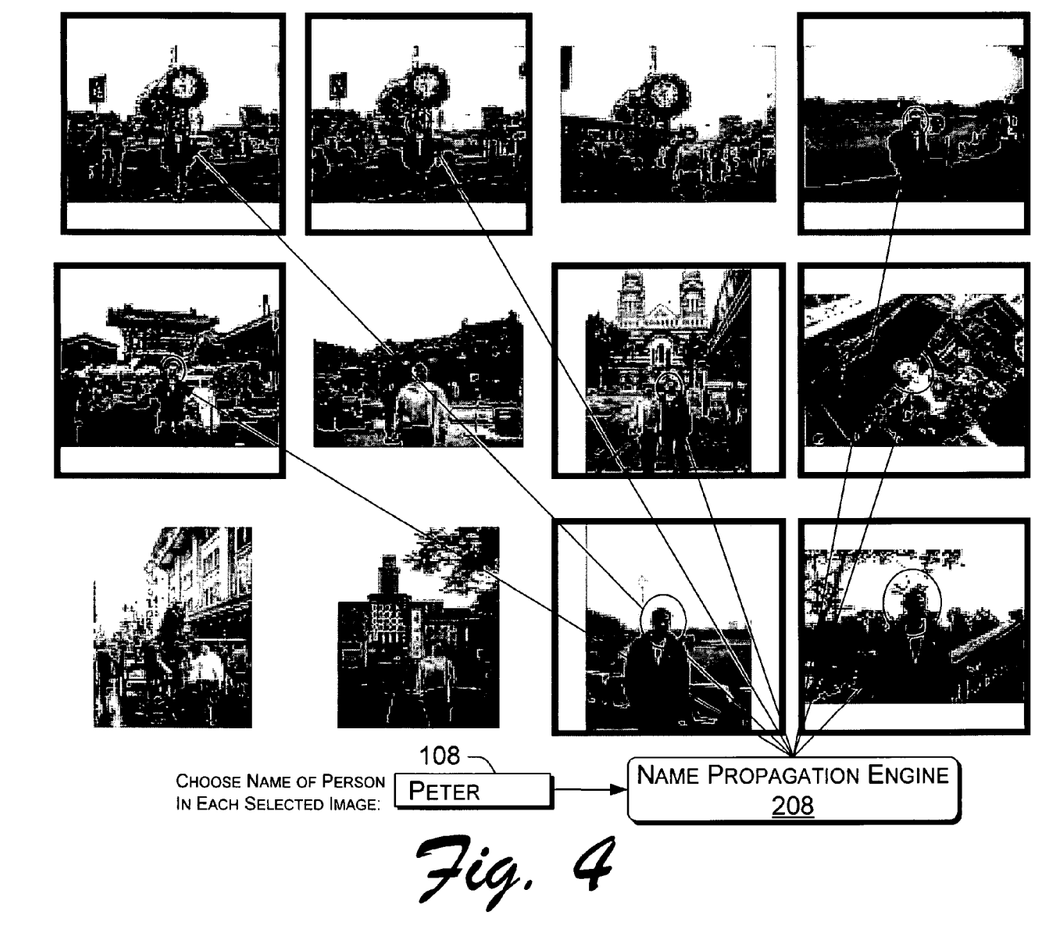
FIG. 4 is a diagram of exemplary face annotation in a browsing mode.

In the browsing mode 302, as shown in FIG. 4, the multi-select engine 204 allows a user to select a number of the images 218, e.g., thumbnails, that each include a particular person, and then enter the person's name 108 or other label via the name inputter 214, in order to globally perform comprehensive (e.g., one-click) assignment of the name 108 to the face of the person in each of the multiple selected images 216. In this browsing mode 302, the name propagation engine 208 tries to infer the correspondence between the input name 108 and the face as it exists in its various forms in the different selected images 216, i.e., tries to propagate the name 108 from image level to face level. Exemplary name propagation will be discussed in more detail further below.

In either mode, generation of the labeled faces list 220 greatly reduces users' efforts in face annotation and empowers users in indexing and searching their photo albums. Rather than opening each photograph in the viewer mode 304, it is often more convenient for users to view a collection of thumbnails to see who is in each photograph and perform the sweeping (e.g., one-click) assignment of a name to multiple photographs, as in the browsing mode 302. In most cases, users browse their albums in the order of the folder, which is closely related to time and event. Alternatively, the browsing mode manager 236 may provide even more effectiveness by offering similar face retrieval. Similar face retrieval allows users to search for similar faces by specifying either a face or a name. Then multiple faces can be annotated in a batch manner. In either manner of browsing, batch annotation can be conducted.

Since users frequently alternate between viewer mode 304, such as a sequential slideshow, and browsing mode 302 of a collection of thumbnails, it makes sense for the annotation that occurs in each mode to assist the other mode. The mode integrator 210 allows the results from one mode of viewing and annotating to benefit the viewing and/or annotating provided by the other mode. That is, the labeled faces list 220 can be used and developed by either mode. The labeled faces list 220 benefits from both the name propagation of the browsing mode 302 and the more manual user-labeling of faces of the viewer mode 304.

It should be noted that some implementations of the face annotation engine 102 may also include components to perform a feature known as "smart thumbnailing" (See, Wang M. Y., Xie X., Ma W. Y., Zhang H. J., "MobiPicture—Browsing Pictures on Mobile Devices", in ACM International Conference on Multimedia, Berkeley, 2003). Conventionally, thumbnail images are generated by directly downsampling original, larger images 218. Often, however, thumbnails generated by this conventional approach are difficult to recognize, especially when the thumbnails are very small. To overcome this limitation, the browsing mode manager 236 or other components may automatically generate the smart thumbnails. In one implementation, when a user moves the mouse onto a thumbnail, the browsing mode manager 236 automatically switches to display the most informative part of the thumbnail image, i.e., face areas, to the user. In one implementation, if the mouse pointer hovers on the thumbnail image for few seconds, the browsing mode manager 236 automatically animates the image with an optimal browsing path to let the user browse through the different parts of the image.

Exemplary Name Propagation

As mentioned, one implementation of the name propagation engine 208 as shown in FIG. 2 tries to propagate a name 108 (that has been applied to a group of selected images 216) to a face that appears in the selected images 216. To accomplish the propagation, the images reader 222 accesses digital data of each of the selected images 216 while a face finder 224 seeks to detect each face that occurs in each image, including faces to which the name 108 will not be assigned. The face identifier 226 then tries to find that face in each of the selected images 216 to which the name 108 does apply.

In one implementation, following an approach similar to that of Zhang L., Chen L., Li M., Zhang H. "Automated annotation of human faces in family albums", in ACM International Conference on Multimedia, pp. 335-358, Berkeley, 2003 (incorporated herein by reference), the face identifier 226 extracts facial appearance features based on face detection results. Because face appearance features are most reliable when extracted from frontal faces, a texture-constrained active shape model is applied to determine if an input face is in frontal view. (See, Yan S. C., et al., "Texture-Constrained Active Shape Models", *Proceedings of The First International Workshop on Generative-Model-Based Vision*, Copenhagen, Denmark, May, 2002). If the face is not in frontal view, the face identifier 226 treats the face appearance feature as a missing feature. After this process, the face identifier 226 aligns each face into standard normalized form to remove the variations in translation, scale, in-plane rotation, and slight out-of-plane rotation. In one implementation, facial appearance features are extracted from normalized gray face images.

The images comparator 228 or other control fabric of the exemplary face identifier 226 can include logic to ignore one or more of the images in the event of mistaken selection. For example, if all of the selected images 216 except one appear to include a face that should be associated with the name 108, then the one may be discarded as mistakenly selected, or the face unidentifiable. The images comparator 228 may also determine that a qualifying face occurs in each of the selected images 216.

The name-to-face correspondence engine ("correspondence engine") 230 employs various techniques, such as a similarity measure function performed by the similarity measure engine 232, to propagate a name 108 from image level to face level. The similarity measure engine 232 may use facial features to identify similar faces, but contextual features may also be used in the similarity measure as now described.

In one implementation, for example, the correspondence engine 230 uses contextual image features in addition to facial appearance features to represent each face. That is, similarities are not only drawn between facial features of candidate faces, but also between the visual contexts near each face in an image. This is especially useful when the images are digital photos, because after multiple photos of a limited group of people are taken within a short time span— those being photographed are typically wearing the same clothes across multiple photos. These photos are often downloaded from a digital camera and stored in the same folder. A browsing mode manager 236 displays these photos simultaneously, and if selected, correspondence engine 230 more easily finds a face with higher confidence in each photo due to the same clothes appearing under the face in each photo.

Figure 5:
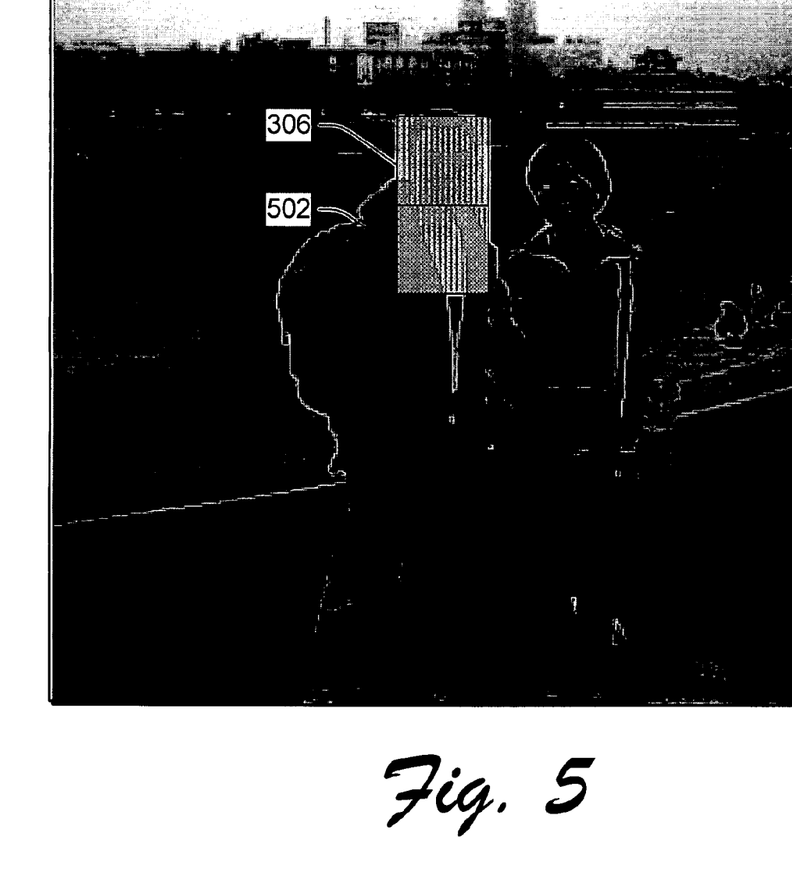
FIG. 5 is a diagram of exemplary face annotation in a viewer mode.

As shown in FIG. 5, the contextual features engine 234 extracts contextual features from an extended face region, such as the example extended face region 502. The contextual features engine 234 can use, for example, a 44-dimensional banded auto-correlogram and/or a 14 dimensional color texture moment as described, respectively, by Huang J., Kumar S. R., Mitra M., Zhu W. J. and Zabih R., in "Image indexing using color correlograms", IEEE Conference on Computer Vision and Pattern Recognition, p. 762, 1997; and Yu H., Li M., Zhang H., and Feng J., "Color texture moment for content-based image retrieval", Proc. IEEE Intl Conf. on Image Processing, September, 2002; which are incorporate herein by reference. The color moment feature in LUV color space (with luminance and chrominance components) can compensate if there is a lack of global color feature. In this exemplary implementation, the contextual features engine 234 divides the extended face region 502 into, for example, 2×1 blocks, and extracts local regional features to capture the structural information of body patches. The contextual features engine 234 can restrict the difference in date attributes of two images to be within a certain time period, such as two days, when comparing images for their contextual similarity.

Similarity, such as facial similarity and/or similarity of contextual features, is defined as maximum a posteriori (MAP) estimation in Zhang L., Chen L., Li M., Zhang H. "Automated annotation of human faces in family albums", ACM International Conference on Multimedia, pp. 335-358, Berkeley, 2003; and Lei Zhang, Yuxiao Hu, Mingjing Li, Weiying Ma, Hongjiang Zhang, "Efficient Propagation for Face Annotation in Family Albums," MM'04, Oct. 10-16, 2004, ACM Multimedia, New York, 2004. Both of these resources are incorporated by reference herein. In one implementation, the correspondence engine 230, and specifically the similarity measure engine 232, perform name propagation by solving a MAP similarity optimization problem.

For example, let $F=\{f_i|i=1, \ldots, N_f\}$ denote the set of features to undergo similarity analysis, where each feature $f_i$ is a vector corresponding to a specific feature. By introducing two classes of face variations, intra-personal variations $\Omega_I$ and inter-personal variations $\Omega_E$, and imposing an independent assumption for each feature $f_i$, the similarity between two faces is defined as in Equation (1):

$$S(F_1, F_2) = \frac{\prod_{j=1}^{N_f} p(\Delta f_i | \Omega_I) p(\Omega_I)}{\prod_{i=1}^{N_f} p(\Delta f_i | \Omega_I) p(\Omega_I) + \prod_{j=1}^{N_f} p(\Delta f_i | \Omega_E) p(\Omega_E)} \quad (1)$$

where $p(\Omega_I)$ and $p(\Omega_E)$ are the a priors, $\Delta f_i = (f_{i1} - f_{i2})$, and $p(\Delta f_i | \Omega_I)$ and $p(\Delta f_i | \Omega_E)$ are the likelihoods for a given difference $\Delta f_i$. This similarity function integrates multiple features into a Bayesian framework. In case there are missing features, marginal probability is used so that samples that have missing features can be compared with those having the full feature set to ensure a non-biased decision. Based on this similarity measure, candidate names for a given unknown face can be derived by statistical learning approaches, such as K nearest neighborhood algorithm.

Given the face similarity measure as defined in Equation (1) above, the similarity measure engine 232 attempts to solve name propagation as an optimization problem, as follows. Assuming N selected images 216 (e.g., photos) at the multi-select engine 204, denoted by $I=\{I_1, I_2, \ldots, I_N\}$ with "∂," (e.g. "Peter") as the name 108 of these N selected images 216, each photo $I_i$ contains ∂, the name 108. Let $F^i=\{F_1^i, \ldots, F_{C_i}^i\}$ be the faces (individuals) in $I_i$, the selected images 216. The name propagation problem is to select N faces denoted by $\Theta=\{f_1, f_2, \ldots, f_N\}$ from N photos (one face from one photo), and assign the ∂ name 108 to these N faces.

In one implementation, the similarity measure engine 232 defines an objective function as the sum of similarities between each pair of faces of the same individual in different photographs, as it is assumed that these selected images 216 share the same property in terms of the specified individual associated with the name 108, and the faces of the one individual should be similar with each other. Therefore, the objective function can be formulated as:

$$Sim(f_1, f_2, \ldots f_N) = \Sigma_{i=1}^{N-1} \Sigma_{j=i+1}^{N} S(f_i, f_j) \qquad (2)$$

The similarity measure engine 232 maximizes the objective function to obtain the optimal solution for name propagation:

$$\{f_1, f_2, \ldots f_N\} = \underset{f_1, f_2, \ldots f_N}{\operatorname{argmax}} Sim(f_1, f_2, \ldots f_N) \qquad (3)$$

Figure 6:
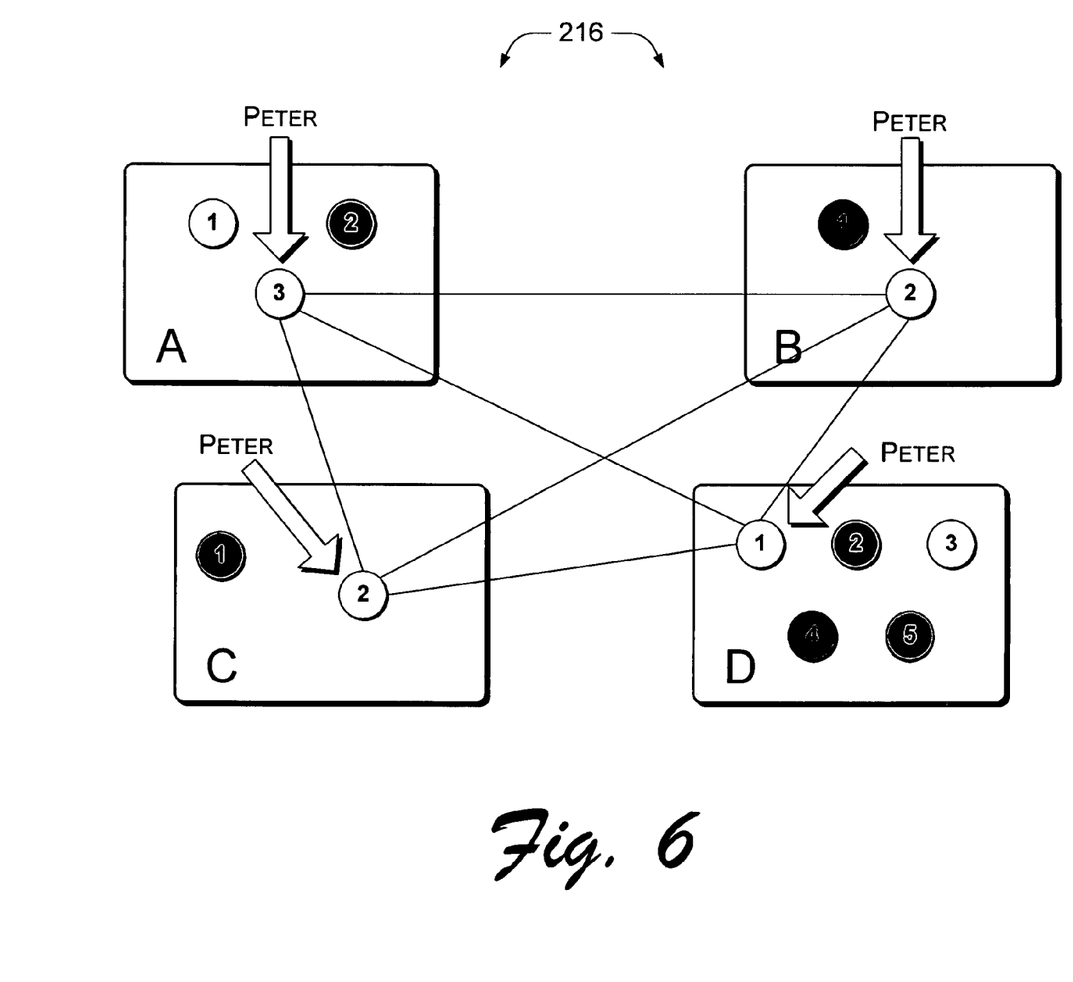
FIG. 6 is a diagram of exemplary name propagation.

FIG. 6 shows an example optimal solution for name propagation. Four selected images 216 (four photographs) are assigned "Peter" as a name 108. That is, via the name inputter 214, a user informs the face annotation engine 102 that each one of the four photographs contains "Peter". Based on the similarity measure between two faces described above, the similarity measure engine 232 tries to infer the correspondence between a face in each photo and the "Peter" name 108. There are 3×2×2×5=60 possible solutions in total for face selection, given the number of faces in each photo. But because faces "A3," "B2," "C2," and "D1" are similar with each other (illustrated by similar shade), the correspondence engine 230 associates these faces with the "Peter" name 108 and adds the associations to the labeled faces list 220.

In one implementation, the similarity measure engine 232 uses an iterative optimization technique. It is an NP-hard problem (a nondeterministic polynomial time problem) to find the globally optimal solution as defined in Equation (3) above for name propagation. (A problem is NP-hard if solving it in polynomial time—the set or property of problems which can be solved by a known polynomial-time algorithm—would make it possible to solve all problems in class NP in polynomial time.) For comparison, a brute force approach would try to enumerate all possible solutions and select the optimal solution in terms of maximal similarity defined in Equation (3) above. However, this enumerative approach would result in a combination explosion problem. For example, if the multi-select engine 204 chose a set of twenty selected images 216 and there were two faces in each image, the number of possible solutions would be $2^{20}=1,048,576$. To avoid combination explosion, the similarity measure engine 232 can use an iterative approach to the optimization problem.

The correspondence engine 230 first selects an initial solution, and then iteratively and greedily adjusts faces in each of the selected images 216 to obtain a solution with larger similarity, until the increasing similarity reaches or approaches stability. In one implementation, the similarity measure engine 232 performs the technique, following these steps:

1) The similarity measure engine 232 accepts as givens, N selected images 216 $\{I_1, I_2, \ldots, I_N\}$, where each image $I_i$ contains face set $F^i = \{F_1^i, \ldots, F_{Ci}^i\}$, and similarity measure $S(F_1, F_2)$.

2) The similarity measure engine 232 selects N faces from N images (one face from one image) as an initial solution $\Theta = \{f_1, f_2, \ldots, f_N\}$, and sets initial similarity sum, e.g., "Sim_Old"=0.

3) For t=1, ..., N, in image $I_t$, that is, in face set $F^t$, the similarity measure engine 232 selects $f_t$ as:

$$f_t = \underset{i \in F^t}{\operatorname{argmax}} \sum_{j=1,\ldots N \cap j \neq i} S(f_i, f_j). \qquad (4)$$

4) The similarity measure engine 232 calculates a new similarity sum Sim as:

$$Sim(f_1, f_2, \ldots, f_N) = \Sigma_{i=1}^{N-1} \Sigma_{j=i+1}^{N} S(f_i, f_j) \qquad (5)$$

5) If Sim−Sim_Old>$\epsilon$, where $\epsilon$ is the pre-determined convergence threshold, then the similarity measure engine 232 sets Sim_Old=Sim and goes back to step 3, above.

6) Otherwise, the similarity measure engine 232 exits the steps of the technique and outputs solution $\{f_1, f_2, \ldots, f_N\}$.

In each iteration of the above steps, the similarity measure engine 232 greedily searches for new solution and guarantees that objective similarity sum is monotonously increased. Thus the similarity measure engine 232 can at least reach local optima (or maxima).

The similarity measure engine 232 greatly reduces the computational complexity from $O(C_1 * C_2 * \ldots * C_N)$ to $O(m (C_1 + C_2 + \ldots + C_N))$, where m is the iteration number. In practice, the correspondence engine 230 can flexibly select an enumerative approach or an iterative approach in accordance with the estimation of computational complexity.

Rejection Schema

Users usually expect correct and successful name propagation results. However, the face annotation engine 102 may occasionally create an incorrect propagation result. As it is generally impractical to let users double-check propagation results, a rejection schema is presented to reject those propagation results with low confidence scores.

After the optimal solution is obtained as described above, the system calculates a confidence score for each face as follows:

$$Conf_i = 1 - \max_{j \in F^i \cap j \neq i} S(f_i, f_j).$$

Taking into account the most similar face in the same photograph that feature $f_i$ is located in, the confidence score actually reflects the uniqueness of face $f_i$ in the photo. If the condition $Conf_i < T_{reject}$, a predetermined threshold for rejection, is true, then the name 108 will not be propagated to this face, and instead, the name is kept only loosely associated with an image instead of a face, that is the name is "dangled" with the image. Dangling names are still useful for both photograph searching and further face annotation. For a photographic search, because the names have been associated with photographs, it is straightforward to find these photographs by the associated names. For face annotation in viewer mode 304, if there is a name associated with a photograph that has a face that the user wants to label, the candidate name list generation will be more accurate, as the dangling name is actually a strong prior.

Alternative Annotation and Propagation

Given both viewer mode 304 and browsing mode 302, users frequently and smoothly alternate between these two modes. Taking into account additional inputs, such as dangling names or labeled faces, face annotation could be made even more efficient, as described next.

From Annotation to Propagation

For the name propagation engine 208 in browsing mode 302, there may be some additional inputs from viewer mode 304, i.e. labeled faces in some images. For example, among the photographs selected by a user, there may be some previously labeled faces, e.g., in the labeled faces list 220. In this case, the iterative optimization performed by the similarity measure engine 232 is adapted to utilize such additional information.

Let $P^+$ be the positive set of faces labeled with the same name as $\partial$, and let $P^-$ be the negative set of faces labeled with different name to $\partial$. Without losing generality, either $P^+$ or $P^-$ can be empty. The iterative optimization performed by the similarity measure engine 232 in the six steps above is modified according to the following rules:

1. Faces in $P^+$ are actually part of the solution in $\theta = \{f_1, f_2, \ldots, f_N\}$. The influence of these faces is allowed, and only faces $\theta \backslash P^+$ in the corresponding photos in the above Equation (4) are changed.

2. Equation (4) is modified to include the influence from $P-$.

$$f_i = \mathrm{argmax}\left( \sum_{j=1,\ldots,N \cap j \neq i} S(f_i, f_j) - \sum_{j \in P^-} S(f_i, f_j) \right)$$

Equation (5) is also modified to include the influence from $P^-$.

$$Sim(f_1, f_2, \ldots f_N) = \sum_{i=1}^{N-1} \sum_{j=i+1}^{N} S(f_i, f_j) - \sum_{i=1}^{N} \sum_{j \in P^-} S(f_i, f_j).$$

With these modifications, the optimal solution will be close to $P^+$ while simultaneously far away from $P^-$.

From Propagation to Annotation

For generation of the labeled faces list 220 in viewer mode 304, there are some additional inputs from the browsing mode 302, i.e., the names dangled at the image level. For example, in a photo in which a user desires to label a face, a name 108 has been associated with the photograph, yet has not been propagated to a face due to low confidence. To utilize dangling names, the view mode manager 236 can adopt an ad hoc strategy by adjusting the prior of dangling name P in photographs $I_i$ as follows:

$$p(P) = \max\left(p(P), \frac{1}{|F^i|}\right)$$

where p(P) is the prior of individual P estimated from historical labeling results, $$\frac{1}{|F^i|}$$

is actually the prior of the individual P that will appear in this photograph, given that $|F^i|$ is the number of faces in photographs $I_i$. In this way, the dangling name will be moved forward in the candidate name list and annotation accuracy is improved.

Figure 7:
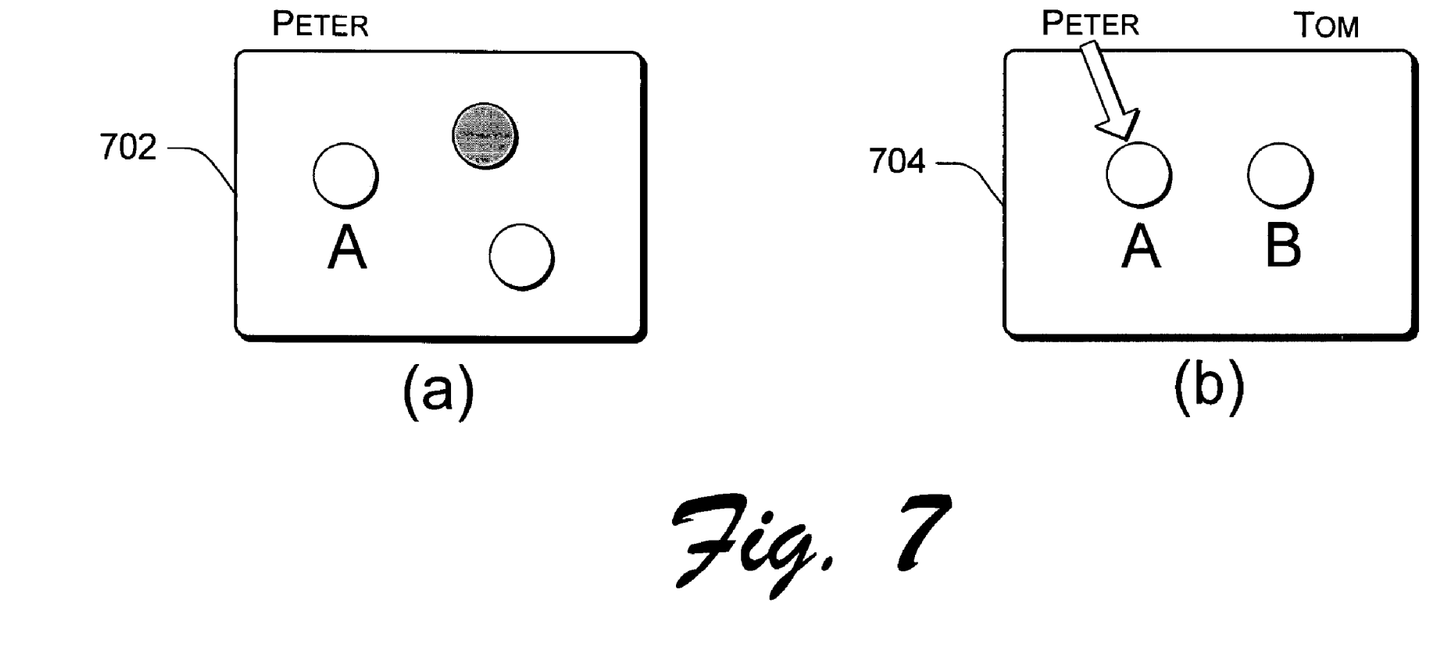
FIG. 7 is a diagram of exemplary name dangling at an image level.

For example, as shown in FIG. 7, the prior of "Peter" is estimated to amount to only 10% from previous labeling results and one name "Peter" is dangling on photograph (a) 702 in FIG. 7. Given this photograph (a) 702 and the dangling name, the prior that face A is "Peter" is 33%. So, 33% is taken as the prior probability of "Peter" in generating the candidate name list for unknown face A. More importantly, multiple dangling names are also useful for annotation, because any face being annotated reduces uncertainties in the corresponding photograph. For example, in photograph (b) 704 in FIG. 7, there are two dangling names associated with photograph (b) 704. Once face A is annotated as "Peter", the name to be associated with face B is immediately determined to be "Tom".

Exemplary Method

Figure 8:
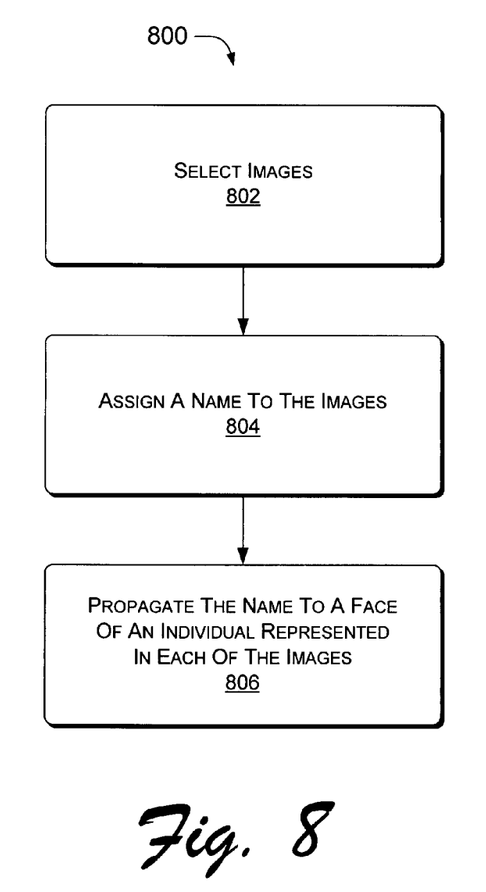
FIG. 8 is a flow diagram of an exemplary method of face annotation.

FIG. 8 depicts an exemplary method 800 to automatically annotate faces in an image collection. In the flow diagram of method 800, the operations are summarized in individual blocks. The operations may be performed by hardware, software, or combinations of both, for example, by components of an exemplary face annotation engine 102.

At block 802, digital images are selected. For example, a browsing mode implemented on a computing device may display thumbnail images of photos stored in a folder on the hard drive. From the entire array of displayed images, a user can select images at will. According to the exemplary method 800, the user selects images that have one or more people in each selected image. The selection itself chooses a set of images that each include a person whose face will be annotated across the selected photos.

At block 804, the set of images is then named with the name or other moniker of the person common to all the selected images. At this point, the exemplary method does not know whose face in the selected photographs should be associated with the input name.

At block 806, the name is propagated to a face of the individual represented in each of the images. To accomplish the name propagation, the exemplary method performs a similarity measure function using the features of pairs of faces in the different pictures. The similarity measure can be greatly enhanced by adding contextual features to the faces, e.g., a person's clothes. Computer subdirectory folders of downloaded photos from a digital camera are often limited to a group of photos that were all taken within a short time period, for example at one event. Thus, the human subjects of the photos often wear the same clothes. This extra-facial information enhances similarity comparisons between face pairs.

In one implementation, the exemplary method includes defining an objective function as a sum of similarities between each pair of faces of the individual in different selected images, and maximizing the objective function in order to associate the name with the face in each image. Once an optimal solution is calculated, the name is applied to the face as it is represented in each selected photo. The annotated faces and names are stored to facilitate future name propagation and face annotation.

CONCLUSION

The above described systems and methods for propagating face annotations can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems, engines, user interfaces, and methods for efficient propagation for face annotation. Although the subject matter has been described in language specific to structural features and/or methodological acts, it is to be understood that the subject matter defined in the appended claims is not necessarily limited to the specific features or acts described above. Rather, the specific features acts described above are disclosed as example forms of implementing the claims.

The invention claimed is:

1. A method, comprising:
   selecting digital images;
   assigning a name to the digital images; and
   propagating the name from the digital images to a face of an individual represented in each of the digital images;
   wherein the propagating includes applying a similarity measure:
      to define an objective function as a sum of similarities between multiple features of each pair of faces of the individual in different selected images, and
      to maximize the objective function in order to associate the name with the face in each image; and
   wherein applying the similarity measure includes integrating the multiple features into a Bayesian framework according to:

$$S(F_1, F_2) = \frac{\prod_{j=1}^{N_f} p(\Delta f_i | \Omega_I) p(\Omega_I)}{\prod_{i=1}^{N_f} p(\Delta f_i | \Omega_I) p(\Omega_I) + \prod_{j=1}^{N_f} p(\Delta f_i | \Omega_E) p(\Omega_E)}$$

where $p(\Omega_I)$ and $p(\Omega_E)$ are a priors, $\Delta f_i = (f_{i1} - f_{i2})$, and $p(\Delta f_i | \Omega_I)$ and $p(\Delta f_i | \Omega_E)$ are the likelihoods of a given difference $\Delta f_i$ between the features.

2. The method as recited in claim 1, wherein the propagating includes
   defining an objective function as a sum of similarities between each pair of faces of the individual in different selected digital images; and
   maximizing the objective function to associate the name with the face in each digital image.

3. The method as recited in claim 1, further comprising improving a name propagation accuracy by using at least some previously named faces of individuals represented in the selected digital images.

4. The method as recited in claim 1, further comprising improving an annotation accuracy by using at least some digital images that have been previously associated with names.

5. The method as recited in claim 1, wherein the propagating includes
   defining an objective function as a sum of similarities between each pair of faces of the individual in different selected digital images, wherein each face includes a visual context of the image near the face; and
   maximizing the objective function to associate the name with the face in each digital image.

6. The method as recited in claim 1, further comprising sharing propagated names information between a browsing mode for viewing and selecting multiple of the digital images and a viewer mode for viewing single digital images and annotating a face in the single digital image.

7. The method as recited in claim 6, wherein the sharing includes sharing a named face from the viewer mode to the browsing mode.

8. The method as recited in claim 6, wherein the sharing includes associating names from the browsing mode with a menu of names for annotating a face in the viewer mode.

9. A face annotation engine, comprising:
   a selection engine for selecting multiple images, each image having at least a face of an individual person in common, wherein the multiple images are capable of including faces of multiple persons;
   a user interface for applying a name to the selected multiple images; and
   a name propagation engine for determining the face common to the selected multiple images and annotating the name to the face;
   wherein the name propagation engine includes a similarity measure engine to define an objective function as a sum of similarities between multiple features of each pair of faces of the individual in different selected images and to maximize the objective function in order to associate the name with the face in each image; and
   wherein the similarity measure engine integrates the multiple features into a Bayesian framework according to:

$$S(F_1, F_2) = \frac{\prod_{j=1}^{N_f} p(\Delta f_i | \Omega_I) p(\Omega_I)}{\prod_{i=1}^{N_f} p(\Delta f_i | \Omega_I) p(\Omega_I) + \prod_{j=1}^{N_f} p(\Delta f_i | \Omega_E) p(\Omega_E)}$$

where $p(\Omega_I)$ and $p(\Omega_E)$ are a priors, $\Delta f_i = (f_{i1} - f_{i2})$, and $p(\Delta f_i | \Omega_I)$ and $p(\Delta f_i | \Omega_E)$ are the likelihoods of a given difference $\Delta f_i$ between the features.

10. The face annotation engine as recited in claim 9, further comprising a labeled faces list for use by a browsing mode manager and a viewer mode manager, wherein the browsing mode manager performs selection and annotation of a group of images and the viewer mode manager performs annotation of a face in a single image.

11. The face annotation engine as recited in claim 9, wherein the name propagation engine includes a contextual features engine to associate multiple faces in different images with the same person based on a non-facial feature that is similar in the different images.

12. The face annotation engine as recited in claim 9, further comprising a list of previously input names and a menu generator to provide a menu of candidate names for annotating a face in an image.

13. The face annotation engine as recited in claim 9, further comprising:
   a similar face retriever to allow a user to search for similar faces by specifying either a face or a name and to annotate multiple faces in a batch manner.

14. The face annotation engine as recited in claim 9, wherein the name propagation engine improves a name propagation accuracy by using at least some previously named faces.

15. The face annotation engine as recited in claim 9, wherein the name propagation engine improves an annotation accuracy by using at least some images that have been previously associated with names.

16. A system, comprising:
- means for selecting a batch of digital images, wherein each image in the batch has at least a face of one person in common;
- means for providing a name for the batch;
- means for propagating the name to the face of the person in common;
- means for applying a similarity measure during the propagating to define an objective function as a sum of similarities between multiple features of each pair of faces of the individual in different selected images, and to maximize the objective function in order to associate the name with the face in each image; and
- means for integrating the multiple features into a Bayesian framework according to:

$$S(F_1, F_2) = \frac{\prod_{j=1}^{N_f} p(\Delta f_i | \Omega_I) p(\Omega_I)}{\prod_{i=1}^{N_f} p(\Delta f_i | \Omega_I) p(\Omega_I) + \prod_{j=1}^{N_f} p(\Delta f_i | \Omega_E) p(\Omega_E)}$$

where $p(\Omega_I)$ and $p(\Omega_E)$ are a priors, $\Delta f_i = (f_{i1} - f_{i2})$, and $p(\Delta f_i | \Omega_I)$ and $p(\Delta f_i | \Omega_E)$ are the likelihoods of a given difference $\Delta f_i$ between the features.

17. The system as recited in claim 16, further comprising:
means for identifying a face between multiple representations of the face in different images based on at least a feature of the face and a feature of a visual context near the face.

* * * * *

UNITED STATES PATENT AND TRADEMARK OFFICE
CERTIFICATE OF CORRECTION

| | | |
|---|---|---|
| PATENT NO. | : 7,403,642 B2 | Page 1 of 1 |
| APPLICATION NO. | : 11/111696 | |
| DATED | : July 22, 2008 | |
| INVENTOR(S) | : Lei Zhang et al. | |

It is certified that error appears in the above-identified patent and that said Letters Patent is hereby corrected as shown below:

In column 12, line 53, in Claim 10, delete "asingle" and insert -- a single --, therefor.

Signed and Sealed this
Third Day of May, 2011

David J. Kappos
*Director of the United States Patent and Trademark Office*